(12) United States Patent
Machill

(10) Patent No.: US 7,503,214 B2
(45) Date of Patent: Mar. 17, 2009

(54) SENSOR

(75) Inventor: Andreas Machill, Idstein (DE)

(73) Assignee: Siemens Aktiengesellschaft, Munich (DE)

( * ) Notice: Subject to any disclaimer, the term of this patent is extended or adjusted under 35 U.S.C. 154(b) by 282 days.

(21) Appl. No.: 10/557,154

(22) PCT Filed: Jun. 7, 2005

(86) PCT No.: PCT/EP2005/052605

§ 371 (c)(1),
(2), (4) Date: Oct. 16, 2006

(87) PCT Pub. No.: WO2005/121808

PCT Pub. Date: Dec. 22, 2005

(65) Prior Publication Data

US 2007/0295086 A1   Dec. 27, 2007

(30) Foreign Application Priority Data

Jun. 11, 2004   (DE) .................. 10 2004 028 334

(51) Int. Cl.
  *G01P 1/02*   (2006.01)
(52) U.S. Cl. .................. 73/494; 384/448
(58) Field of Classification Search .......... 73/494, 73/493, 513; 384/448
   See application file for complete search history.

(56) References Cited

U.S. PATENT DOCUMENTS 3,577,115 A * 5/1971 Whitright .............. 439/528
5,011,303 A    4/1991 Caron
5,923,094 A * 7/1999 Seeberger et al. .......... 307/9.1
6,589,069 B1   7/2003 Liao
7,011,451 B2 * 3/2006 Tajima et al. ............ 384/448
7,137,740 B2 * 11/2006 Vignotto et al. .......... 384/448
7,288,930 B2 * 10/2007 Clark .................... 324/174
7,405,554 B2 * 7/2008 Yao ..................... 324/160
2002/0095989 A1 * 7/2002 Foster et al. ............ 73/493
2003/0179967 A1 * 9/2003 Meeker et al. .......... 384/448
2004/0119465 A1 * 6/2004 Clark .................... 324/174
2008/0053245 A1 * 3/2008 Yao .................... 73/862.08

FOREIGN PATENT DOCUMENTS

| DE | 44 28 197 A1   | 2/1996 |
| DE | 195 13 085 C1  | 4/1998 |
| EP | 0 697 681 A2   | 2/1996 |
| FR | 2 766 299 A1   | 1/1999 |
| JP | 3017324 U      | 2/1991 |
| JP | 11002840       | 1/1999 |

* cited by examiner

*Primary Examiner*—Hezron Williams
*Assistant Examiner*—Samir M Shah
(74) *Attorney, Agent, or Firm*—Lucas & Mercanti, LLP

(57) ABSTRACT

A sensor, suitable for being secured to a wheel bearing of a motor vehicle and serving to measure the rotational speed of the wheel, has a securing ring, a sensor block, at least one electrical line, at least one connector and at least one retaining bridge. The sensor block is electrically connected to the connector by means of the electrical line, and is connected to the securing ring at least by means of a plastic extrusion coating. A retaining bridge is integrally formed on the plastic extrusion coating and carries the connector until the sensor is installed at the location of its final intended position.

4 Claims, 3 Drawing Sheets

SENSOR

FIELD AND BACKGROUND OF THE INVENTION

The invention relates to a sensor, in particular to a sensor which is secured to a wheel bearing of a motor vehicle and serves to measure the rotational speed, having a securing ring, a sensor block, at least one electrical line, at least one connector and at least one retaining bridge, with the sensor block being electrically connected to the connector by means of the electrical line, and the sensor block being connected to the securing ring at least by means of a plastic extrusion coating.

Sensors of the type mentioned in the introduction are used, for example, in motor vehicles for detecting the rotational speed of a wheel. Up until the sensor is installed at the location of its final intended position, that is to say on the wheel bearing of a motor vehicle for example, the connector has to be mounted in such a way that neither it nor the electrical line leading to it are damaged in any way. To this end, a transportation ring which securely holds the connector is fitted to the securing ring of the sensor in accordance with the prior art. When the sensor is installed at the location of its final intended position, the connector is removed from the transportation ring and is connected to the downstream electronics. The transportation ring is then removed from the securing ring and generally disposed of. This method of securing the connector to the sensor before said sensor is installed at the location of its final intended position is very complicated and expensive. Removal of the transportation ring from the sensor when said sensor is installed generates additional expenditure and the material of the transportation ring is lost.

SUMMARY OF THE INVENTION

The object of the invention is therefore to provide a sensor of the type mentioned in the introduction which can be produced and installed in a particularly cost-effective manner, but at the same time ensures that its connector and the electrical line leading to said connector are effectively protected until the sensor is installed at the location of its final intended position.

According to the invention, this object is achieved in that a retaining bridge is integrally formed on the plastic extrusion coating and carries the connector until the sensor is installed at the location of its final intended position. This has the advantage that the retaining bridge is formed at the same time as the sensor is produced in the method step of extrusion coating the sensor block and the securing ring. The connector can then be mounted on the retaining bridge until the sensor is installed at the location of its final intended position. In the case of a retaining bridge formed in this way, material costs are saved and high process reliability is achieved. Manufacturing tolerances are avoided since there is no need to attach a transportation ring to the sensor.

In one refinement of the invention, predetermined breaking points are formed on the retaining bridge and are destroyed when the sensor is installed at the location of its final intended position. The predetermined breaking points on the retaining bridge make it possible for said retaining bridge to be deliberately separated after the sensor is installed at the location of its final intended position. The retaining bridge then breaks off at previously precisely determined points, as a result of which the incorporated sensor is prevented from being damaged by the retaining bridge being separated.

In one development, a connector bearing is formed on the retaining bridge and holds and fixes the connector until the sensor is installed at the location of its final intended position. The connector can be securely retained by the connector bearing until the sensor is installed. The connector can then be removed from the connector bearing so that said connector can be connected to the downstream electronics. The connector can be clipped into and unclipped from the connector bearing.

Installation time and costs are saved as a result of the inventive method for installing a sensor on a wheel bearing of a motor vehicle. It is only necessary to press the sensor onto a wheel bearing, to remove the connector from the retaining bridge and connect it to the downstream electronics, and then push away the retaining bridge using the vehicle axle. This considerably reduces the number of method steps required to install the sensor at the location of its final intended position.

BRIEF DESCRIPTION OF THE DRAWINGS

The invention will be explained in greater detail with reference to the figures, in which.

DETAILED DESCRIPTION OF THE PREFERRED EMBODIMENT(S)

Figure 1:
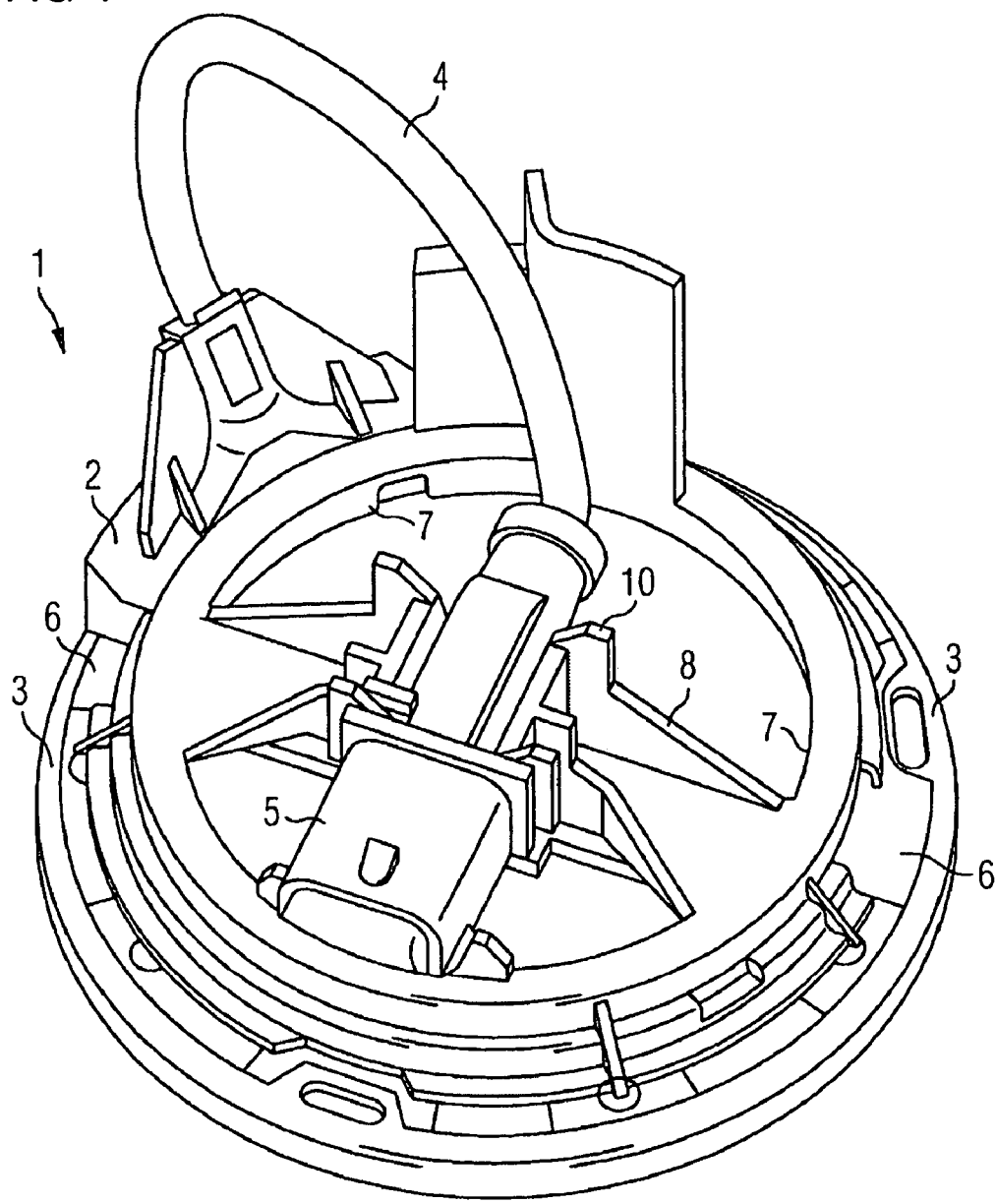
FIG. 1 shows a perspective view of a sensor with a transportation ring according to the prior art.

FIG. 1 shows a perspective view of a sensor 1 with a transportation ring 7 according to the prior art. The sensor 1 comprises a sensor block 2, a securing ring 3, an electrical line 4, a connector 5 and an extrusion coating 6. The sensor block 2 contains the electronics required to detect a signal. For example, the sensor block 2 may contain a Hall element which can detect the variation in a magnetic field, as a result of which the sensor 1 is able to detect the rotational speed of a wheel of a motor vehicle, for example.

The sensor block 2 is connected to the securing ring 3. The extrusion coating 6 is applied both to the securing ring 3 and to the sensor block 2 in an injection-molding process. There may also be further mechanical connections (not illustrated here) between the sensor block 2 and the securing ring 3. The electronic signals generated by the sensor block 2 are fed to the connector 5 via the electrical line 4. The connector 5 is connected to downstream electronics, for example to a controller in a motor vehicle. The signals generated by the sensor 1 are evaluated and processed further in the controller.

Up until the sensor is installed at the location of its final intended position, the electrical line 4 and the connector 5 have to be protected against damage. To this end, a transportation ring 7 is formed according to the prior art and is fitted with the securing ring 3. A retaining bridge 8 is formed on the transportation ring 7 and a connector bearing 10 is generally integrated in said retaining bridge. The connector 5 is clipped into the connector bearing 10 as long as the sensor 1 is not installed at the location of its final intended position.

When the sensor 1 is installed at the location of its final intended position, the connector 5 is unclipped from the connector bearing 10 and connected to the downstream electronics. The transportation ring 7 is removed from the securing ring 3 and disposed of. It can clearly be seen that the transportation ring 7 is a complex component which is responsible for a high proportion of the material costs. When the sensor 1 is installed at the location of its final intended position, the securing ring 3 has to be removed in a complicated and involved manner.

Figure 2:
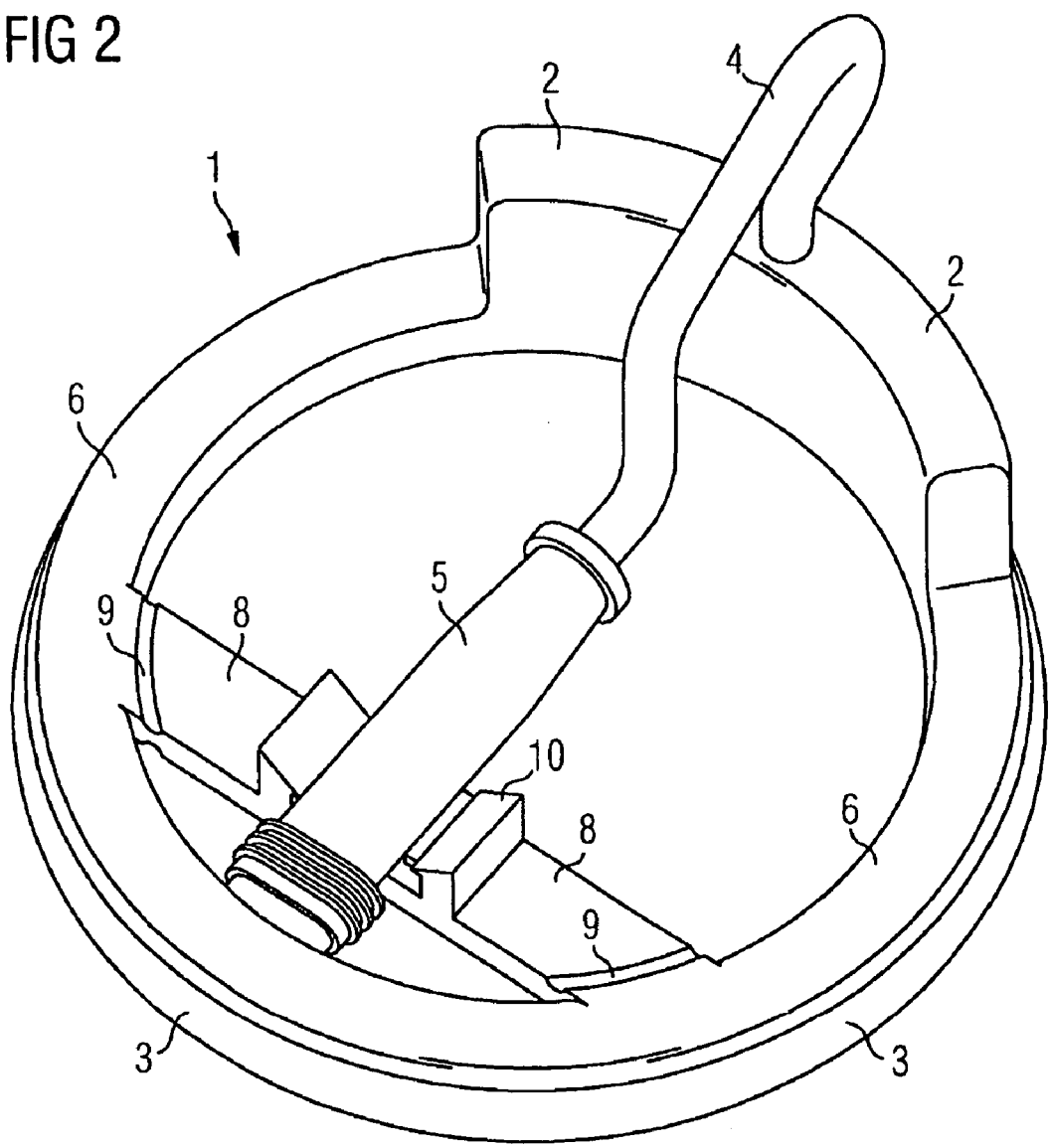
FIG. 2 shows a perspective view of a sensor with a retaining bridge.

FIG. 2 shows a perspective view of a sensor 1 with a retaining bridge 8. A securing ring 3, a sensor block 2, an electrical line 4 and a connector 5 can also be seen in this sensor 1. As in FIG. 1, the electrical line 4 connects the sensor block 2 to the connector 5. The transportation ring 7 known from FIG. 1 is not present in this case.

Before the sensor 1 is installed at the location of its final intended position, the connector 5 is mounted in the retaining bridge 8. To this end, a connector bearing 10 is formed on the retaining bridge 8. The connector 5 is clipped into this connector bearing 10. When the sensor 1 is installed at the location of its final intended position, the connector 5 is firstly unclipped from the connector bearing 10 and connected to the downstream electronics. After the securing ring 3 has been pressed onto a wheel bearing (not illustrated here), a vehicle axle (also not illustrated here) can be pushed through the securing ring 3, said vehicle axle separating the retaining bridge 8 from the extrusion coating 6. This separation occurs at previously defined predetermined breaking points 9.

The retaining bridge 8 is a part which is substantially smaller than the transportation ring 7 known from the prior art. When a retaining bridge 8 which is integrally formed on the plastic extrusion coating 6 is used, substantially less waste material is produced than when a transportation ring 7 according to the prior art is used. The retaining bridge 8 can be produced at the same time as the sensor 1 is produced in the method step of extrusion coating the sensor block and the securing ring with plastic, and this significantly reduces the costs for the sensor.

Figure 3:
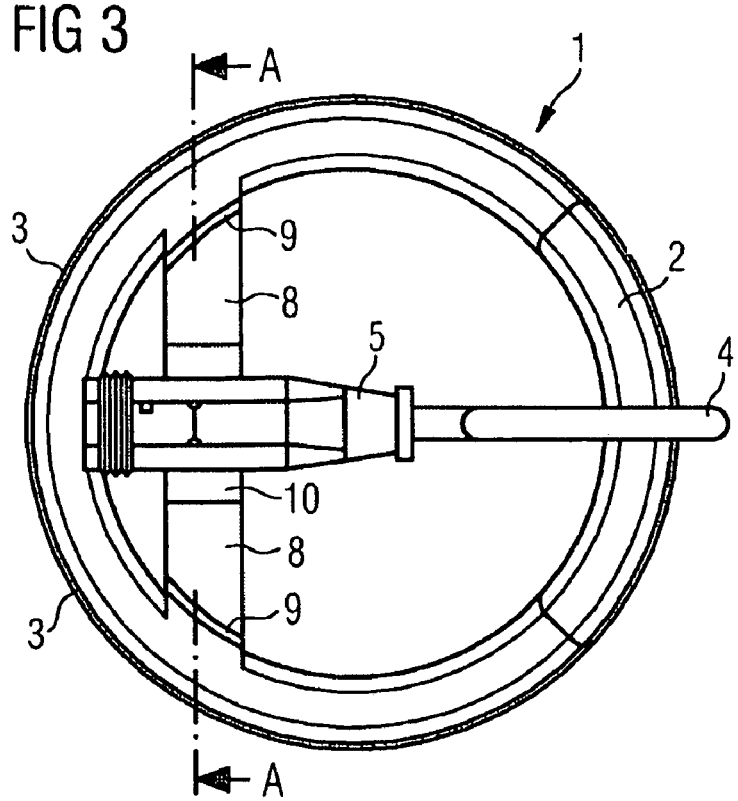
FIG. 3 shows a two-dimensional plan view of the sensor illustrated in a perspective manner in FIG. 2.

FIG. 3 shows a two-dimensional plan view of the sensor 1 which is illustrated in a perspective manner in FIG. 2. The sensor block 2 and the securing ring 3 can be seen in this case too. The sensor block 2 is secured to the securing ring 3 by an extrusion coating 6. The electrical line 4 leads from the sensor block 2 to the connector 5. The connector 5 is mounted in the connector bearing 10 which is formed on the retaining bridge 8. As is also illustrated in FIG. 2, the retaining bridge 8 is formed in one piece with the extrusion coating 6. Predetermined breaking points 9 can be clearly seen on the retaining bridge 8. After the sensor 1 is installed on a wheel bearing (not illustrated here) and the connector 5 is connected to the downstream vehicle electronics, the retaining bridge 8 is pushed away from the sensor 1 by a vehicle axle for example, with a previously defined break being produced at the predetermined breaking points 9. This allows the sensor 1 to be installed in a very precise manner.

Figure 4:
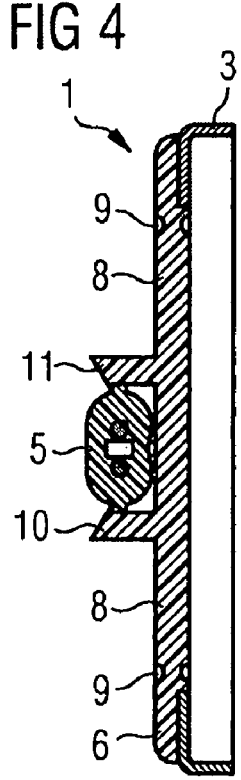
FIG. 4 shows a sectional illustration of the sensor according the line A-A shown in FIG. 3.

FIG. 4 shows a sectional illustration of the sensor 1 described in FIG. 3 in accordance with line A-A from FIG. 3. FIG. 4 also shows the securing ring 3 which is connected to the extrusion coating 6 on which, in turn, the retaining bridge 8 is integrally formed. The connector 5 is mounted in the connector bearing 10, it being possible to clearly see the clipping arrangement 11 of the connector 5 to the connector bearing 10.

The invention claimed is:

1. A sensor (1), suitable for securement to a wheel bearing of a motor vehicle and serving to measure the rotational speed of the wheel the sensor comprising: a securing ring (3), a sensor block (2), at least one electrical line (4), at least one connector (5), and at least one retaining bridge (8), wherein the sensor block (2) is electrically connected to the connector (5) by means of the electrical line (4), and the sensor block (2) is connected to the securing ring (3) at least by means of a plastic extrusion coating (6), the retaining bridge (8) is integrally formed on the plastic extrusion coating (6) and carries the connector (5), and wherein the bridge is detachable from the sensor upon installation of the sensor (1) at the location of its final intended position.

2. The sensor (1) as claimed in claim 1, wherein predetermined breaking points (9) are formed on the retaining bridge (8) and are broken when the sensor (1) is installed at the location of its final intended position.

3. The sensor (1) as claimed in claim 1, wherein a connector bearing (10) is formed on the retaining bridge (8), and holds and fixes the connector until the sensor (1) is installed at the location of its final intended position.

4. A method for installing a sensor (1), as claimed in claim 1, on a wheel bearing of a motor vehicle, comprising the following steps:

the securing ring (3) is pressed onto the wheel bearing, the connector (5) is removed from the retaining bridge (8), the connector (5) makes contact with downstream electronics, and a vehicle axle is fitted, with the retaining bridge (8) being removed from the extrusion coating (6) of the sensor (1) at the predetermined breaking points (9).

* * * * *